July 7, 1959 W. H. McKEE 2,894,241

RIGHT-ANGLE PRINTED WIRE CONNECTOR

Filed March 28, 1956

INVENTOR.

William H. McKee,

United States Patent Office 2,894,241

Patented July 7, 1959

2,894,241

RIGHT-ANGLE PRINTED WIRE CONNECTOR

William H. McKee, Prospect Heights, Ill., assignor, by mesne assignments, to United Carr Fastener Corporation, Boston, Mass., a corporation of Delaware Application March 28, 1956, Serial No. 574,507

7 Claims. (Cl. 339—17)

This invention relates to an angle connector useful especially in conjunction with printed wire circuit panels, and more particularly to a connector structure for joining together two printed wire circuit panels at an angular inclination with respect to each other so that the printed wires thereof are respectively aligned and can be connected together in a dip soldering operation. The invention has utility, for example, in mounting a tube-socket printed circuit member on a printed circuit chassis panel at right angles with respect thereto.

Often, in printed wire circuits it is necessary to secure one panel having printed wires thereon at an angle on another panel having wires imprinted thereon so that the wires of each panel are respectively aligned and can be joined together in a soldering operation. A common instance of one presenting several problems is the connection of a tube-socket panel to the chassis of a printed circuit. The problems in such a mounting are complicated in that the tube socket panel and mounting therefor must be sufficiently rigid to permit a tube to be pushed into and withdrawn from the socket without flexing, or without appreciable relative movement between the panels since movement may cause breakage at the solder joints connecting the respective wires of the panels. An unstable mounting would also increase the difficulty of inserting and removing tubes from the socket; and if the electric equipment is used in vehicles or elsewhere where there is vibration, the movement between the panels caused by such vibration could in time break the solder joints and could also adversely influence the general operation of the apparatus.

A need exists for a connector structure that can firmly secure two panels together at an angular inclination with respect to each other, and it is accordingly an object of this invention to provide such a connector. Another object of the invention is in providing a connector that will accomplish this result in a simple and easy manner, wherein the connection between panels can be performed with facility by even unskilled workmen. Still another object is in providing a connector adapted for use particularly with printed wire circuit panels, and which is inexpensive to fabricate and can be produced in a simple stamping operation.

Still another object is in the provision of means for angularly connecting printed wire circuit panels comprising a pair of brackets slidably carried by one panel and having portions insertable through openings provided for that purpose in another panel, the slidable movement between the brackets and panel being utilized to rigidly lock the brackets in their projected positions through the openings in the other panel. A further object is that of providing a bracket of the character described having a hook adapted to be interconnected with a printed wire circuit panel, and having also a bifurcated projection providing ears adapted to be extended through an opening in a printed wire circuit panel and slidably receiving therebetween a second printed wire circuit panel, the ears converging toward each other to permit ready insertion through an opening in one panel and being spread apart after such insertion by the sliding movement therebetween of the second panel. Additional objects and advantages relating not only to the connector structure per se, but also to the fabrication and use thereof, will be made evident and will become apparent as the specification is developed.

Illustrative embodiments of the invention are shown in the accompanying drawing, in which—

Figures 1, 2, 3, 4, 5, 6, 7, 8, 9, 10, 11, 12:
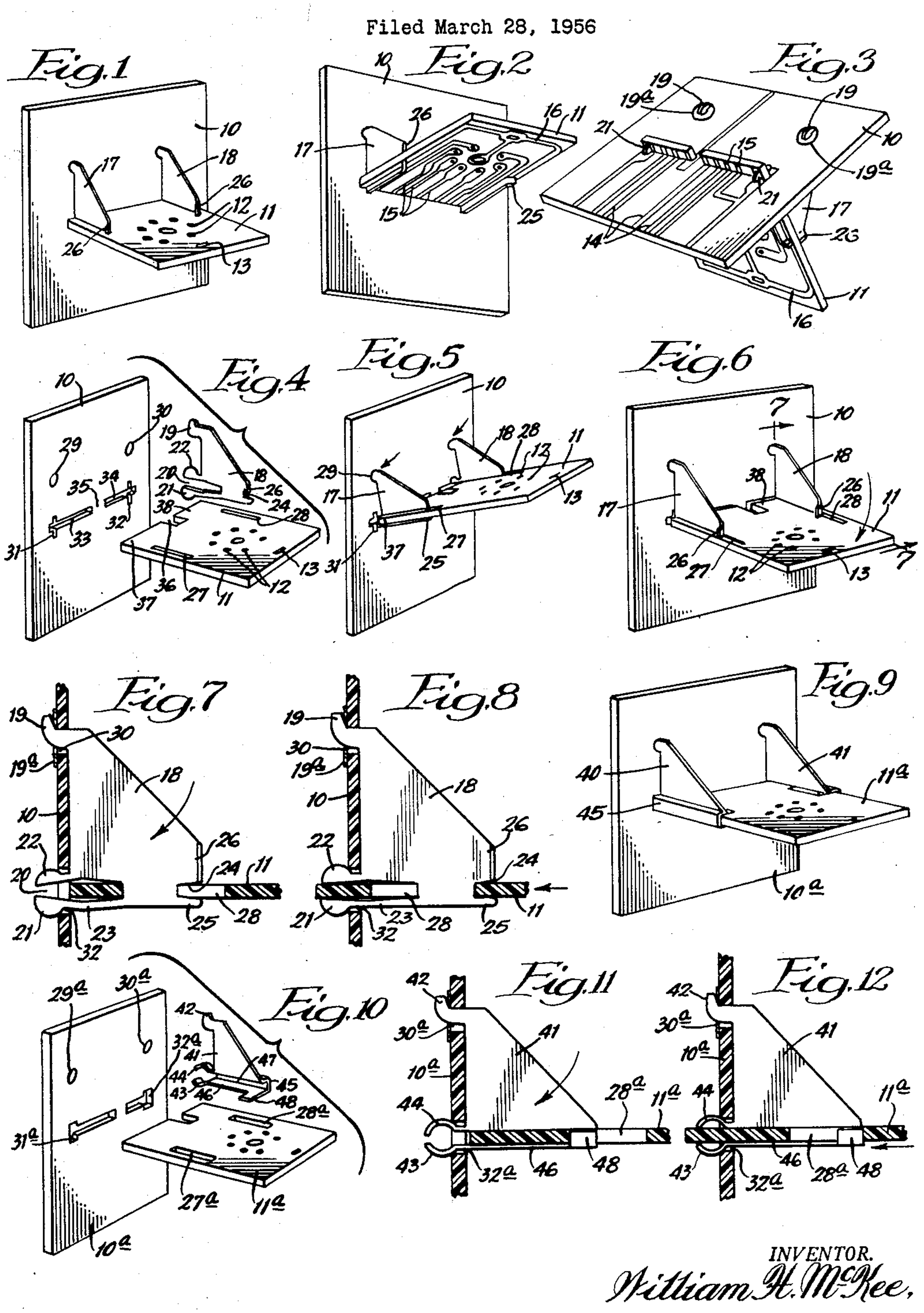
Figure 1 is a perspective view of a pair of printed wire circuit panels joined together by a connector structure of this invention.
Figure 2 is a perspective view of the assembly illustrated in Figure 1, but being made so as to show the underside of one of the panels.
Figure 3 is another perspective view of the assembly shown in Figures 1 and 2, but being taken from a different vantage point to show the reverse side of the vertically positioned panel in the first two figures.
Figure 4 is a perspective view showing a pair of panels and one of the connector brackets, all in spaced apart relation.
Figure 5 is a perspective view illustrating the first step in connecting a pair of panels together.
Figure 6 is a perspective view showing another step in the assembly.
Figure 7 is a broken enlarged sectional view taken along the line 7—7 of Figure 6, showing in detail the assembly step in that figure.
Figure 8 is an enlarged broken sectional view also taken along the line 7—7 of Figure 6, but showing a subsequent step in the assembly operation.
Figure 9 is a perspective view similar to that of Figure 1, but showing a modified form of connector bracket.
Figure 10 is an exploded perspective view corresponding to the perspective view of Figure 4, but showing the modified form of bracket illustrated in Figure 9.
Figures 11 and 12 are each enlarged broken sectional views corresponding, respectively, to the showings of Figures 7 and 8, but illustrating the modified form of connector bracket.

For purposes of illustrating the connector invention in an environmental setting, the figures of the drawing show the connector in use in conjunction with printed wire circuit panels. The panel designated with the numeral 10 may be considered the chassis of a printed wire circuit, and the panel 11 in the illustration given is a tube-socket printed circuit board or panel. It will be appreciated that the panels 10 and 11 are exemplary only of various panels that may be interconnected by the structure of this invention, and the invention is applicable in connecting other types and forms of panels at an angular inclination with respect to each other. Most generally, a tube-socket printed circuit panel board will be connected at right angles to another board because a right-angle connection is most convenient in inserting a tube into a tube socket carried by the board and in withdrawing a tube from such socket. Other angular positioning of the panel 11 with respect to the panel 10 might be employed.

For purposes of simplifying the illustration, a socket has not been shown in conjunction with the board 11, but if one were employed it would be positioned on the upper side of the board 11 (as that board is shown in Figure 1), and the pin receptacles of the socket would project downwardly through the apertures 12 provided in the board. If the tube socket employs a metal shield, a ground wire from the shield could extend downwardly through the generally rectangular aperture 13 and be connected to a ground wire on the underside of the panel.

As seen in Figure 3, the board or chassis 10 has a plurality of printed wires 14 extending along the underside thereof. Similarly, the tube socket panel 11 is equipped with a plurality of printed wires 15 extending along the underside thereof, each of the wires 15 terminating adjacent one of the pin apertures 12 in the board. For purposes of identification, the wire serving as a ground for the circuit of the panel 11 is designated with the numeral 16. Printed wire circuit panels of the character herein shown are well known in the art, and for that reason no further description thereof will be set forth.

The panels 10 and 11 are fixedly secured together by connector brackets 17 and 18. The brackets 17 and 18 are identical in construction and function, and for that reason a detailed description of but one of these brackets will be set forth hereinafter. Any suitable number of brackets might be used in securing one panel to another, and in the case of extremely long panels it may be desirable to use more than two connector brackets. While conceivably, a single connector bracket might be employed to anchor one panel to another, it is generally preferable to employ at least two connector brackets to assure greater stability in the connection.

The brackets comprise a bracket body that, in a very general sense, approximates the configuration of a right-angle triangle. At its upper end, the bracket is equipped with a forwardly projecting hook or tab 19 which may be turned upwardly as shown. Adjacent the base, the bracket is bifurcated and defines an elongated slot 20 that extends forwardly from approximately the mid-portion of the bracket body. The forward end of the slot is defined by a pair of ears 21 and 22 that project forwardly of the bracket body and are substantially in vertical alignment with the tab or hook 19.

As is seen most clearly in Figures 4 and 7, the ears 21 and 22 tend to converge, and such convergence is accomplished by bending upwardly the leg 23 which carries the ear 21. This reduces the width of the slot 20 in the area of the ears 21 and 22 for a purpose that will be brought out hereinafter.

Along the rear edge of the bracket and adjacent the base thereof, is a slot or recess 24 that is in axial alignment with the slot 20. As is most apparent from Figure 7, the leg or arm 25 that defines the slot 24 along the lower edge thereof becomes progressively thicker toward the forward end of the bracket body to reduce the dimension of the recess. The purpose for this will be brought out hereinafter. Preferably, the tip of the leg 25 is turned laterally slightly in one direction with respect to the planar surface of the bracket body, while the upper leg or arm 26 that defines the recess 24 along the upper edge thereof is turned laterally slightly in the opposite direction. As has been brought out hereinbefore, the brackets 17 and 18 are identical; and it will be noted in Figures 1 and 6 in particular that the legs 26 of each bracket are turned in the same direction, and similarly (as is most clear from Figure 2) the legs 25 of each bracket are turned in the same lateral direction.

The brackets 17 and 18 are slidably carried by the panel 11. For this purpose, the panel is provided with elongated channels 27 and 28 that receive, respectively, the brackets 17 and 18. The brackets are constrained in position upon the panel 11 since the forward edge portions of the panel are slidably received within the slots 20 of the brackets. At the same time, the portion of the brackets between the inner ends of the slots 20 and recesses 24 are slidably positioned within the channels 27 and 28. This arrangement is apparent from all of the figures, with the exception of Figure 4 which shows the various elements in spaced apart relation and prior to the assembly of the bracket members and the panel 11.

In normal position upon the panel 11, the ears 21 and 22 of each bracket project forwardly of the panel, as is illustrated most clearly in Figure 7, and the brackets are maintained in such position because of the convergence of the ears which reduces the dimension of the slot 20 at the forward end thereof, thereby preventing rearward movement of the brackets relative to the panel 11. In such position, the brackets are adapted to be interconnected with the panel 10, and for that purpose the panel 10 is provided with a pair of openings 29 and 30 that are adapted to receive, respectively, the hooks 19 of the brackets 17 and 18. About the openings 29 and 30 are printed wire portions 19*a* to which the tabs or hooks can be soldered to rigidly anchor the bracket in place. Also, the panel 10 is provided with elongated openings or locking channels 31 and 32 vertically aligned, respectively, with the openings 29 and 30. The locking openings or apertures are adapted to receive and pass therethrough the ears 21 and 22 when those ears are in the converged condition shown in Figure 7.

The panel 10 is provided with a pair of transversely extending channels 33 and 34 in axial alignment with each other and that intersect, respectively, the locking apertures 31 and 32. The channels 33 and 34 differ in length, with the channel 33 exceeding slightly in length that of the channel 34. Interposed between the two channels is a portion of the panel 10 that may be thought of as a guide or aligning element, and is designated with the numeral 35. The guide 35 is adapted to be received within a recess 36 provided in the panel 11 and that, together with the longitudinal edges of that panel, define segments 37 and 38 adapted to be slidably received, respectively, within the channels 33 and 34.

The brackets are preferably formed of metal and may be fabricated in a simple stamping operation. For simplicity and reasons of cost savings, the brackets 17 and 18 are identical and, therefore, an identical stamping serves for both of the brackets. Assembly of the brackets with the panel 11 is a simple operation, the leg 23 of each bracket being simply inserted through the channels 27 and 28 and the bracket moved forwardly within those channels until the converging ears 21 and 22 are positioned forwardly of the panel.

To secure the tube-socket panel 11 in position upon the chassis panel 10, the hooks 19 of each of the brackets are inserted through the apertures or openings 29 and 30. The insertion may be carried forth as illustrated in Figure 5, which shows that the panel 11 may be tilted slightly with respect to the panel 10 to project the hooks substantially longitudinally through the restricted openings 29 and 30. Thereafter, the panel 11 is moved downwardly from the position shown in Figure 5 into that illustrated in Figure 6, and during such downward movement the ears 21 and 22 of each bracket which are aligned with the locking openings 31 and 32 are pushed forwardly therethrough. After these two steps, the assembly is in the condition shown in Figure 7.

Thereafter, the tube socket panel 11 is pushed forwardly with respect to the buckets and toward the chassis panel 10. At this time, the segments 37 and 38 are aligned with the channels 33 and 34, and the guide 35 is in alignment with the recess 36. The panel 11 is pressed forwardly so that the segments thereof move into the channels 33 and 34, and ultimately the panel moves forwardly through the restricted ends of the bracket slots 20 to press against the sides thereof and force the ears 21 and 22 apart. Those ears then tightly abut the rear surface of the chassis panel 10, as do the hooks 19, to firmly secure the two panels together, as is shown in Figure 8.

As has been brought out before, the recess 24 of each bracket converges slightly toward the forward end thereof, and when the socket panel 11 is moved forwardly and into that recess, it frictionally engages the edges of the recess and slightly embeds those edges within itself. Thus, the rear end portion of each bracket firmly grips the socket panel 11, and such gripping action is furthered by the frictional engagement between the laterally turned tip of the leg 25 and the laterally turned arm or leg 26.

It is noted from Figure 3 that when the structure is completely assembled, the printed wires 14 and 15 of the respective panels are aligned with each other in a predetermined arrangement and are in substantially abutting relation. The self-aligning or polarizing arrangement comprising the offset guide 35 and recess 36 permit the panels 10 and 11 to be assembled so that the panel 11 extends only from the side of the panel 10 that does not have the printed wires thereon. That is to say, with the polarizing arrangement, it is impossible to improperly mount the panel 11 upon the panel 10.

After the panels have been assembled, as is shown in Figures 1 through 3, the panel 10 is dipped into a liquid solder bath to solder the printed wires 14 and 15 together to establish an electric circuit therebetween. At the same time, globules of solder will adhere to the hooks 19 and ears 21 and 22 to further anchor the bracket members in position and complement the rigidity of the mounting previously provided thereby. The solder connections have not been shown because their inclusion in the drawing would interfere with the detail presented therein, and dip soldering operations and the character of the solder connections provided thereby are known and understood by those familiar with this art.

A modified form of bracket structure is illustrated in Figures 9 through 12. The brackets are designated with the numerals 40 and 41 and are shown connecting together a chassis panel **10*a* and socket panel 11*a*. These panels are similar to the panels 10 and 11 heretofore described, the only difference being in the width of the channels 27*a* and 28*a* of the socket panel, and the width of the locking openings 31*a* and 32*a*** of the chassis panel.

The brackets are also quite similar to the brackets heretofore described, and are each equipped with a straight or upwardly turned hook or tab 42 at the upper end thereof and ears 43 and 44 that are arcuate and are oriented in facing relation with each other so that the forward free ends thereof are in juxtaposition. The lower edge portion of the bracket body is turned laterally outwardly to provide an upper leg 45, is then turned downwardly and thereafter inwardly to provide the lower leg 46. The legs 45 and 46 are spaced apart and define a longitudinally extending slot 47 therebetween that extends outwardly and between the ears 43 and 44. The slot 47 is adapted to slidably receive the panel **11*a* therein, and to constrain the brackets in position upon that panel, the thicker portion 48 of the lower leg 46 is turned upwardly and into the channels 27*a* or 28*a*, as the case may be, whereby the brackets are slidable longitudinally with respect to the socket panel 11*a* within the limits defined by the channels 27*a* and 28*a***.

In use of the structure, the brackets are mounted upon the panel **11*a* in the manner indicated, the hooks 42 are extended through the openings 29*a* and 30*a*, the ears are extended through the locking apertures 31*a* and 32*a*, and thereafter the panel 11*a* is pushed forwardly and into the position shown in Figure 12 where it expands the ears 43 and 44 or spreads them apart, thereby bringing them into tight engagement with the panel 10*a***.

In either form of the invention, it is possible to dis-assembly the socket panel from the chassis panel simply by pushing the socket panel rearwardly to remove it from between the ears of the brackets. Thereafter, the ears can be withdrawn from the locking apertures to free the brackets. However, such an operation is difficult, for in each form of the invention the forward edges of the ears dig into the surfaces of the socket panel and tend to prevent rearward movement of that panel with respect to the brackets. However, the assembly of the socket panel and chassis panel is intended to be permanent, and when once made, disassembly should never be required.

It will be appreciated that the brackets are simply and economically fabricated and are positioned upon the carrier panels expediently and with a minimum of effort. Further, the brackets permit a pair of panels to be angularly secured together in a quick, simple assembly operation that can be carried forth by unskilled workmen without a chance of error, particularly because of the polarization feature provided between the panels to be assembled, yet the brackets are rigidly anchored to the carrier panel (that is, the tube socket panel in the illustration given) and to the receiving panel or chassis panel in the illustration herein considered. The mounting is sufficiently rigid so as to permit tubes to be pushed into and withdrawn from their sockets without appreciable flexible or bending movements of the tube socket panel with respect to the chassis panel. Thus, the likelihood of breaking a solder connection between the printed wires of those panels is substantially minimized.

While in the foregoing specification embodiments of the invention have been described in considerable detail for purposes of making a complete disclosure, it will be appreciated by those skilled in the art that numerous changes may be made in those details without departing from the spirit and principles of the invention.

I claim:

1. In combination, a pair of panels adapted to be secured together in angular relation, and a connector bracket for effectuating the securance thereof, said bracket having a pair of spaced ears defining a slot therebetween slidably receiving one of said panels for forward movement therein in right-angular relation to the other of said panels, the walls of said slot converging forwardly to a spacing less than the thickness of the aforesaid one panel, the other panel having an opening therein adapted to receive said ears therethrough, said first mentioned panel being movable forwardly in said slot after said ears are extended through said opening to expand the ears and thereby secure said panels together.

2. The combination of claim 1 in which said other panel is provided with an elongated slot therein communicating with said opening, and in which said one panel is provided with at least a portion thereof adapted to be extended through said elongated slot after said ears are projected through said opening.

3. The combination of claim 1 wherein said bracket is provided with a forwardly projecting tab disposed in spaced superposed relation to said ears, and in which said other panel is provided with an aperture therein for passing said tab therethrough.

4. In a combination of the character described, a pair of panels, one of which is provided with an aperture therethrough and spaced therefrom an opening communicating with a transversely extending slot, the other panel having a portion thereof adapted to be extended through said slot, and a bracket equipped at its forward end with an outwardly projecting tab and spaced therefrom a pair of ears, said tab and said ears being alignable respectively with said aperture and with said opening and being extended therethrough, said bracket having an elongated slot extending between said ears and portions of the aforesaid other panel being slidable longitudinally within said last mentioned slot and when moved forward therein is operative to spread said ears apart, the aforesaid one panel being projected through said first mentioned slot to spread said ears and thereby anchor the panels and bracket together in a stable assembly.

5. The structure of claim 4 in which said bracket is provided along its rear edge with a recess aligned with the slot therein, said recess toward the forward end thereof having converging walls biting into said other panel when that panel is moved forwardly with respect to the bracket.

6. In a bracket structure adapted for use in mounting one printed wire circuit panel on another at an angular position with respect to each other, one of the panels having an aperture therethrough and a locking opening spaced therefrom and also a transversely extending slot communicating with that opening, the other panel being adapted to slidably carry a bracket thereon and having an end portion adapted to project through said transversely extending slot, and a bracket slidably carried by said other panel for relative longitudinal movement with respect thereto, said bracket having at the upper end thereof a hook adapted to be extended through said aperture and spaced therefrom a pair of ears adapted to extend through said locking opening and being spaced apart for passing said other panel therethrough, the normal spacing between said ears being such that the ears can be projected through said locking opening and being less than the thickness of said other panel whereby when that panel is moved forwardly between said ears, the ears are spread apart to effectuate a locking engagement with said one panel.

7. In an assembly of the character described, a panel carrying printed wires, said panel having a pair of spaced apart transversely extending slots axially aligned and separated from each other by a guide element, said panel having adjacent the outer ends of said slots locking openings therethrough, said panel having also in spaced alignment with said openings hook-receiving apertures therethrough, a second panel having printed wires for connection with said wires of said first panel, said panel having a recess alignable with said guide element and defining a pair of panel segments adapted to be projected through said transversely extending slots, and a pair of connector brackets equipped with hooks adapted to be projected through said apertures and having ears adapted to be projected through said locking openings, said ears being spaced apart and being adapted to be spread apart to a greater extent by said second mentioned panel when said ears are projected through said openings and the segments of said panel are projected through said transversely extending slots.

References Cited in the file of this patent

UNITED STATES PATENTS

| | | |
|---|---|---|
| 1,803,016 | Harstead | Apr. 28, 1931 |
| 1,938,370 | Bodkin | Dec. 5, 1933 |
| 2,454,681 | Wallin | Nov. 23, 1948 |
| 2,498,623 | Poupitch | Feb. 21, 1950 |
| 2,616,643 | Budd | Nov. 4, 1952 |
| 2,770,435 | Becker | Nov. 13, 1956 |